US012499725B2

(12) United States Patent
Ooi et al.

(10) Patent No.: US 12,499,725 B2
(45) Date of Patent: Dec. 16, 2025

(54) DEVICE AND METHOD FOR RESTRICTING A VEHICLE OPERATOR FROM PASSING THROUGH AN ACCESS-CONTROLLED BARRIER IN RESPONSE TO A PARKING VIOLATION

(71) Applicant: MOTOROLA SOLUTIONS, INC., Chicago, IL (US)

(72) Inventors: Lee Sun Ooi, Kulim (MY); Kin Hee Woo, Gelang Patah (MY); Shyan Jenq Ho, Bayan Lepas (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 171 days.

(21) Appl. No.: 18/607,803

(22) Filed: Mar. 18, 2024

(65) Prior Publication Data

US 2025/0292642 A1 Sep. 18, 2025

(51) Int. Cl.
*G07C 9/10* (2020.01)
*G07C 9/25* (2020.01)

(52) U.S. Cl.
CPC .............. *G07C 9/10* (2020.01); *G07C 9/257* (2020.01)

(58) Field of Classification Search
CPC . G07C 9/10; G07C 9/257; G07C 9/37; G07C 15/00; G06K 9/00; H04L 12/28
(Continued)

(56) References Cited

U.S. PATENT DOCUMENTS

| 8,698,896 B2 * | 4/2014 | Nerayoff ................ G06V 20/62 |
| | | 382/104 |
| 9,558,665 B2 | 1/2017 | Wang |

(Continued)

FOREIGN PATENT DOCUMENTS

WO 2007027818 A1 3/2007

OTHER PUBLICATIONS

Chan, Chee Kit et al.: "System and Method for Executing Additional Analytics at an Access Controlpoint", U.S. Appl. No. 18/481,262, filed: Oct. 5, 2023, all pages.
(Continued)

*Primary Examiner* — Nam V Nguyen
(74) *Attorney, Agent, or Firm* — Raguraman Kumaresan

(57) ABSTRACT

A process for restricting a vehicle operator from passing through an access-controlled barrier in response to a parking violation. In operation, an electronic computing device determines that a vehicle is parked in violation of a parking regulation enforced in a parking space and that a vehicle operator associated with the vehicle has exited the vehicle after having parked the vehicle in violation of the parking regulation. The electronic computing device then compares an identifiable feature uniquely associated with the vehicle operator with an identifiable feature uniquely associated with a person approaching the access-controlled barrier. The person is identified as the vehicle operator who parked the vehicle in violation of the parking regulation when there is a threshold level of correlation between the identifiable feature uniquely associated with the person and the identifiable features uniquely associated with the vehicle operator. The electronic computing device restricts the person identified as the vehicle operator from passing through the access-controlled barrier.

20 Claims, 5 Drawing Sheets

(58) Field of Classification Search
USPC .......................................... 340/5.2; 348/148
See application file for complete search history.

(56) References Cited

U.S. PATENT DOCUMENTS

| | | | | |
|---|---|---|---|---|
| 10,657,749 | B2* | 5/2020 | Nye | G07C 9/37 |
| 10,733,810 | B2* | 8/2020 | Gopalakrishnan | G07B 15/02 |
| 10,930,151 | B2* | 2/2021 | Yan | G08G 1/0116 |
| 11,200,767 | B2* | 12/2021 | Boyes | G07C 9/37 |
| 12,277,114 | B2* | 4/2025 | Seguin | G06F 16/245 |
| 2012/0158466 | A1* | 6/2012 | John | G07B 15/02 |
| | | | | 705/13 |
| 2014/0368652 | A1* | 12/2014 | Wang | G06V 20/52 |
| | | | | 348/148 |
| 2015/0009047 | A1* | 1/2015 | Ashkenazi | G08G 1/0175 |
| | | | | 340/932.2 |
| 2019/0009713 | A1* | 1/2019 | Pal | G08G 1/149 |
| 2020/0074753 | A1 | 3/2020 | Adiga et al. | |
| 2020/0410251 | A1* | 12/2020 | Petrey, Jr. | G08B 7/06 |
| 2022/0179987 | A1 | 6/2022 | Venuti et al. | |
| 2023/0267750 | A1* | 8/2023 | Kadavil | G06V 10/7784 |
| | | | | 348/149 |
| 2024/0331393 | A1* | 10/2024 | Petrey, Jr | G08B 27/003 |

OTHER PUBLICATIONS

Luczak, Lukasz et al.: "System and Computer-Implemented Method For Responding to a Potential or Actual Vehicle Theft", U.S. Appl. No. 18/490,092, Filed: Oct. 19, 2023, all pages.

* cited by examiner

DEVICE AND METHOD FOR RESTRICTING A VEHICLE OPERATOR FROM PASSING THROUGH AN ACCESS-CONTROLLED BARRIER IN RESPONSE TO A PARKING VIOLATION

BACKGROUND

As the number of vehicles in urban areas continues to rise, effective management of vehicles in parking lots through enforcement of parking regulations becomes increasingly crucial for maximizing space utilization and ensuring smooth traffic flow and safety of motorists and pedestrians. Enforcing parking regulations presents several challenges including limited resources and inconsistent enforcement. Manually detecting and enforcing parking regulations requires a considerable amount of manpower to patrol and monitor parking violations across a wide area.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
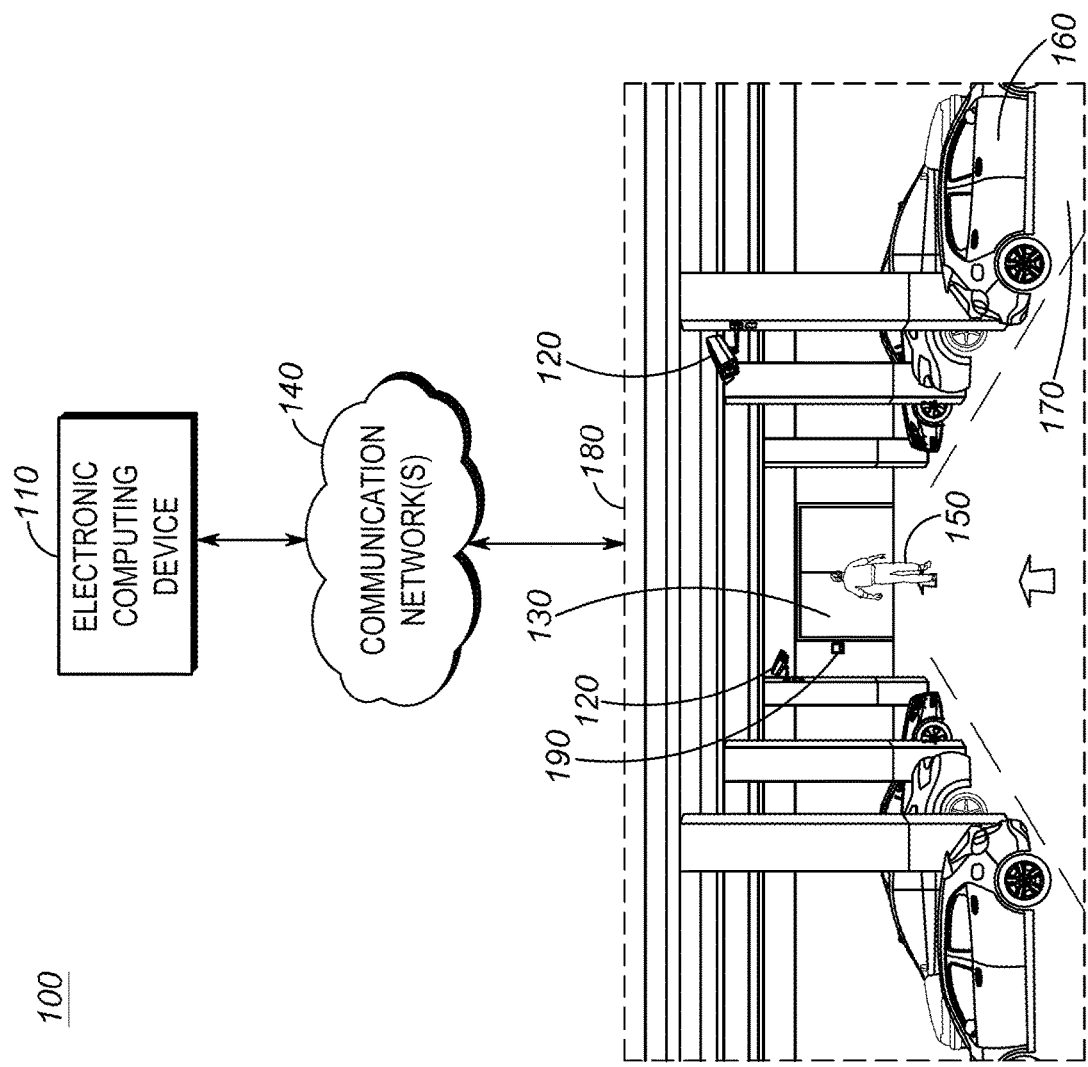
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, manual enforcement of parking regulations has several limitations and often depends on the effectiveness of the parking enforcement officers. Parking enforcement officers cannot be expected to be present at all locations and at all times to detect and issue citations for parking violations. Parking citations or fines are typically imposed only after the officer patrolling the area finds that the vehicle is not parked in compliance with parking regulations. Most often, vehicle operators are not made aware of the parking violation until they return to the parked vehicle and notice the citation placed on the vehicle. This means that the vehicle may remain parked in violation of the parking regulation until the vehicle is towed or the vehicle operator finds about the citation and takes an action to either re-park the vehicle or exit the parking space. In some situations, such a time delay between the detection of parking violation by the parking enforcement officer and towing of the vehicle or the person taking an action to re-park the vehicle or exit the parking space may have public-safety implications (e.g., due to a vehicle being parked in front of a fire hydrant) in addition to severely restricting the orderly management of parking spaces (e.g., due to a vehicle being parked in a space reserved for disabled people) and smooth flow of traffic (e.g., due to a vehicle being parked outside of a parking space).

To address the above limitations, there is a need for a technological solution that automates detection of parking violations, identification of vehicle operators involved in parking violations, and enforcing a restriction on such vehicle operators. In particular, a technological solution to automatically restrict such vehicle operators from passing through an access-controlled barrier and entering a facility (e.g., a shopping mall) or exiting a facility (e.g., parking lot) would enable the vehicle operators to take action (for example, to return to the parking space and re-park the vehicle) on an immediate basis to comply with the parking regulations.

One embodiment provides a method of restricting a vehicle operator from passing through an access-controlled barrier in response to a parking violation. The method comprises determining, at an electronic computing device, that a vehicle is parked in violation of a parking regulation enforced in a parking space; determining, at the electronic computing device, that a vehicle operator associated with the vehicle has exited the vehicle after having parked the vehicle in violation of the parking regulation; capturing, at the electronic computing device, an identifiable feature uniquely associated with the vehicle operator; determining, at the electronic computing device, that a person is approaching an access-controlled barrier associated with the parking space; determining, at the electronic computing device, whether an identifiable feature uniquely associated with the person correlates with the identifiable feature uniquely associated with the vehicle operator; identifying, at the electronic computing device, the person approaching the access-controlled barrier as the vehicle operator who parked the vehicle in violation of the parking regulation when there is a threshold level of correlation between the identifiable feature uniquely associated with the person and the identifiable feature uniquely associated with the vehicle operator; and restricting, at the electronic computing device, the person identified as the vehicle operator from passing through the access-controlled barrier.

Another embodiment provides an electronic computing device, comprising: a communications interface; and an electronic processor communicatively coupled to the communications interface. The electronic processor is configured to: determine that a vehicle is parked in violation of a parking regulation enforced in a parking space; determine that a vehicle operator associated with the vehicle has exited the vehicle after having parked the vehicle in violation of the parking regulation; capture one or more identifiable features uniquely associated with the vehicle operator; determine that a person is approaching an access-controlled barrier associated with the parking space; determine whether an identifiable feature uniquely associated with the person matches with the one or more identifiable features uniquely associated with the vehicle operator; identify the person approaching the access-controlled barrier as the vehicle operator who parked the vehicle in violation of the parking regulation when the identifiable feature uniquely associated with the person matches with the one or more identifiable features uniquely associated with the vehicle operator; and restrict the person identified as the vehicle operator from passing through the access-controlled barrier.

Each of the above-mentioned embodiments will be discussed in more detail below, starting with example system and device architectures of the system in which the embodiments may be practiced, followed by an illustration of processing blocks for achieving an improved technical method of restricting a vehicle operator from passing through an access-controlled barrier in response to a parking violation. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110, one or more sensors 120, and one or more access-controlled barriers 130. The electronic computing device 110 is configured to communicate with the sensor(s) 120 and the access-controlled barrier(s) 130 via one or more communication networks 140. In accordance with embodiments, the electronic computing device 110 is any computing device that is configured to execute a process of restricting a vehicle operator from passing through an access-controlled barrier 130 in response to a parking violation. The term "vehicle operator" refers to a person (e.g., person 150) who is identified as having parked a vehicle (e.g., vehicle 160) in violation of one or more parking regulations enforced in one or more parking spaces 170 maintained by and/or connected to a facility 180.

The sensors 120 include, but not limited to, one or more of video cameras, ultrasonic sensors, pressure sensors, infrared sensors, microwave sensors, radars, light detection and ranging sensors (LiDARs), and various other sensors. The system 100 may include any number of sensors 120 mounted to any suitable structure in proximity to the parking spaces 170 and the access-controlled barrier 130. In accordance with some embodiments, the sensors 120 are configured to electronically capture sensor data corresponding to one or more of: persons 150, vehicles 160, and parking spaces 170 located in a coverage area of the sensors 120 and further transmit the captured sensor data to the electronic computing device 110. In one embodiment, the electronic computing device 110 may process the sensor data to perform one or more of: (i) detecting whether or not a vehicle 160 is parked in violation of one or more parking regulations enforced in the one or more parking spaces 170; (ii) detecting whether or not a parking space 170 is occupied by a vehicle 160 at any given point in time; (iii) capturing identifiable feature(s) associated with a vehicle 160 (e.g., vehicle license plate number) and/or a person 150 (e.g., facial feature(s) of a person) identified to have operated the vehicle 160 at the time of parking the vehicle 160 in the one or more parking spaces 170; (iv) detecting presence of child, or pet animals, or other unapproved objects left behind in a parked vehicle in violation of parking regulations enforced in the parking space 170; (v) detecting if a person 150 (also referred herein as a "vehicle operator") identified to have operated a vehicle 160 at the time of parking the vehicle 160 has exited the vehicle 160 after having parked the vehicle 160 in violation of a parking regulation enforced in the one or more parking spaces 170; (vi) detecting if a person 150 (e.g., after parking a vehicle 160) is approaching an access-controlled barrier 130; and (vii) capturing identifiable feature(s) (e.g., facial feature) corresponding to a person 150 approaching and/or attempting to pass through the access-controlled barrier 130.

The parking regulations enforced in each parking space (e.g., parking space(s) 170 maintained by and/or connected to a facility 180) may be stored at the electronic computing device 110 for use in detecting if a vehicle 160 parked in a parking space 170 (e.g., as detected based on sensor data obtained from the sensor(s) 120) is in violation of a parking regulation enforced at the parking space 170. The term "facility" 180 may refer to a partially or completely enclosed or unenclosed parking facility 170 that offers one or more parking spaces for vehicles. The term "facility" 180 may also refer to a facility other than a parking facility (e.g., a shopping complex or a residential building) that is directly connected to or integrated with one or more parking spaces 170 for parking vehicles 160.

In accordance with some embodiments, the electronic computing device 110 continuously or periodically obtains and processes sensor data captured by the sensor(s) 120 to determine if the sensor data indicates that a vehicle 160 is parked in violation of one or more parking regulations stored at the electronic computing device 110 corresponding to a particular parking space where the parking regulations are enforced. The term "parking regulation" may refer to any parking regulation typically enforced in a parking space. As an example, a parking regulation may require a vehicle parked in a parking space to have a valid parking permit (e.g., a parking permit provided only to residents of a building) or sticker. As another example, a parking regulation may require that no child or pet should be left unaccompanied in a parked vehicle. As another example, a parking regulation may enforce time limits for a vehicle parked in a parking space. As another example, a parking regulation may require a vehicle to be parked within boundary lines marked for a parking space. As another example, a parking regulation may designate certain parking spaces for loading and unloading of goods or passengers with time limits or restrictions to prevent extended parking. As another example, a parking regulation may designate certain areas (e.g., fire lanes, emergency access routes, crosswalks etc.) in which parking is prohibited. As another example, a parking regulation may prohibit parking in certain parking spaces to facilitate street cleaning or maintenance activities on certain days or times. Other parking regulations not listed here may also be enforced in one or more of the parking spaces 170. In any case, the electronic computing device 110 processes the sensor data obtained from the sensor(s) 120 to detect if the sensor data captured corresponding to a vehicle 160 indicates whether the vehicle 160 is parked in violation of a parking regulation enforced in the one or more parking spaces 170.

The access-controlled barrier(s) 130 may include a door, gate, mantrap, portal, turnstile, or any other physical structure that can be electronically controlled by the electronic computing device 110 to restrict a person 150 from passing through the access-controlled barrier 130 in response to detecting that the person 150 has violated a parking regulation. As an example, the access-controlled barrier 130 may be placed at a pedestrian exit (which may connect to a street entrance or another building) of a parking lot that houses the one or more parking spaces 170. In this example, when a person 150 on foot approaches the access-controlled barrier 130, the person 150 is restricted from passing through the access-controlled barrier 130 and further exiting the parking facility 180 if the person 150 is identified as the vehicle operator who parked the vehicle 160 in violation of a parking regulation. In another example, the parking facility itself 180 may not have an access-controlled barrier 130 that is controlled by the electronic computing device 110. Instead, in this example, the access-controlled barrier 130 may be provided at a pedestrian entrance of a second facility (e.g., a shopping center, a residential building, a hotel, a restaurant, a transportation hub, an entertainment venue etc.) that is connected to the parking facility 180 to allow or restrict persons on foot to enter the second facility. In this example, the person 150 who is identified to have violated a parking regulation may be allowed to exit the parking facility 180, but will be restricted from entering the second facility (e.g., via an access-controlled barrier 130 provided at the entrance of the second facility) connected to the parking facility 180. In any case, the access-controlled barrier 130, whether provided at the exit of a parking facility 180 or at the entrance of a second facility connected to the parking facility 180, is programmed to receive an electronic signal from the electronic computing device 110 with an instruction to restrict a person 150 from passing through the access-controlled barrier 130 when the electronic computing device determines that the person 150 approaching and/or attempting to pass through the access-controlled barrier 130 is identified as a vehicle operator who parked a vehicle 160 in violation of a parking regulation enforced in the parking space 170. In response to receiving an instruction from the electronic computing device 110, the access-controlled barrier 130 is locked to restrict the person 150 from passing through the access-controlled barrier. Restricting a person 150 from passing through the access-controlled barrier 130 may also restrict the person 150 from one of exiting the facility 180 or from entering a second facility connected to the facility 180.

In some embodiments, the access-controlled barrier 130 is coupled to an access control reader 190. The access control reader 190 may be a reader (e.g., a RFID reader, a near-field communication (NFC) reader, camera etc.) configured to communicate with a device (e.g., a RFID badge or a mobile device) associated with a person 150 approaching the access-controlled barrier 130. In these systems, the access control reader 190 may be configured to receive an access control token (e.g., RFID tag, QR code etc.) via an RFID badge or a mobile device associated with a person 150 and may allow the person 150 to pass through the access-controlled barrier after verifying the access control token. In accordance with some embodiments, the electronic computing device 110 overrides the functions of the access control reader 190 in order to perform an additional verification process to check whether a person 150 (who otherwise may be authorized to pass through the access-controlled barrier 130 upon verification by the access control reader 190) is identified as a vehicle operator who parked a vehicle 160 in violation of a parking regulation enforced in a parking space 170 associated with the facility 180. If the person 150 is identified as a vehicle operator who parked the vehicle 160 in violation of a parking regulation, then the electronic computing device 110 controls the access-controlled barrier 130 to restrict the person 150 from passing through the access-controlled barrier 130 and accessing a facility connected to the parking space 170 even if the person 150 is otherwise verified by the access control reader 190 as having authorization to access the facility. On the other hand, if a person 150 approaching the access-controlled barrier 130 is identified as someone who did not park a vehicle in violation of the parking regulations, then the electronic computing device 110 refrains from taking any step to restrict the passage of the person 150 via the access-controlled barrier 130 or to override the function of the access control reader 190. In this case, the access control reader 190 may directly control the access-controlled barrier 130 to allow the person 150 to pass through the access-controlled barrier 130 after verification of the person 150, for example, by validating an access control token received from an RFID badge presented by the person 150.

In accordance with some embodiments, the system 100 further includes an electronic display or speaker (not shown) placed in proximity to the access-controller barrier 130. When a decision is made by the electronic computing device 110 to restrict a person from passing through the access-controlled barrier 130 in response to detecting a parking violation, the electronic computing device 110 controls the electronic display and/or speaker to provide visual and/or audible information indicating that the person 150 is being restricted from passing through the access-controlled barrier 130 for a parking violation. Optionally, the electronic display or speaker is further controlled by the electronic computing device 110 to provide visual and/or audible information citing a parking regulation that is particularly violated by the person 150. The electronic computing device 110 may also control the electronic display and/or speaker to request the person 150 to re-park the vehicle in compliance with the parking regulation before attempting again to pass through the access-controlled barrier 130. In some embodiments, the electronic computing device 110 may additionally or alternatively transmit a notification to a communication device of the person 150 to indicate that the person 150 is being restricted from exiting the parking facility 180 or entering a facility connected to the parking facility 180 based on a parking violation.

The communication network 140 may include wireless and/or wired connections. For example, the communication network 140 may be implemented using a wide area network, such as the Internet, a local area network, such as a Wi-Fi network, and personal area or near-field networks, for example a Bluetooth™ network. Portions of the communications network may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

Figure 2:
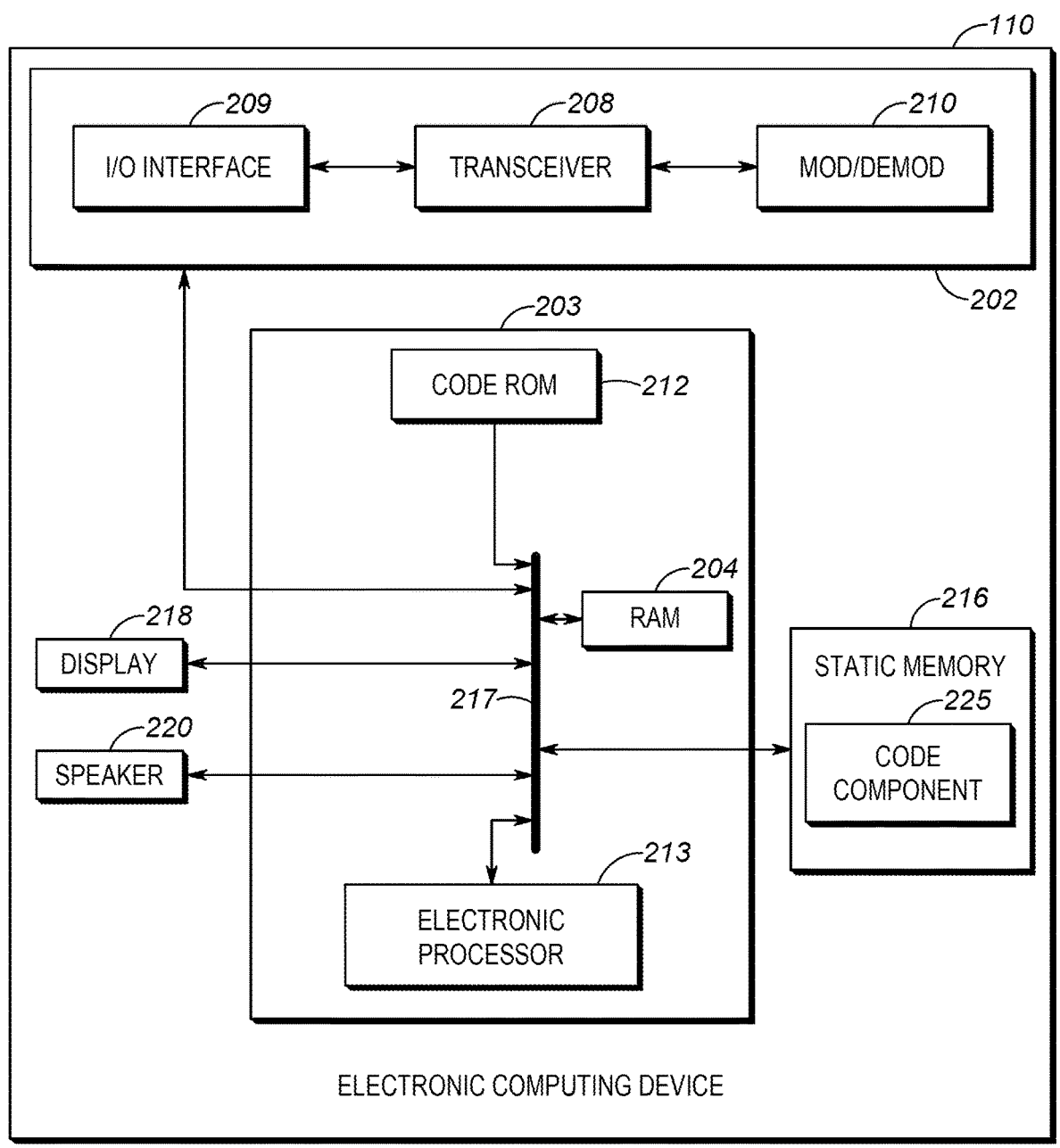
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 can be implemented within one or more of the sensor 120, access-controlled barrier 130, or access control reader 190 shown in FIG. 1. While FIG. 2 represents an electronic computing device 110 described above with respect to FIG. 1, the electronic computing device 110 may include fewer or additional components in configurations different from that illustrated in FIG. 2.

As shown in FIG. 2, the electronic computing device 110 includes a communications interface 202 coupled to a common data and address bus 217 of a processing unit 203. The communications interface 202 sends and receives data to and from other devices in the system 100. The communications interface 202 may include one or more wired and/or wireless input/output (I/O) interfaces 209 that are configurable to communicate with other devices (e.g., sensor(s) 120) in the system 100. For example, the communications interface 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications interface 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications interface 202.

Figure 3:
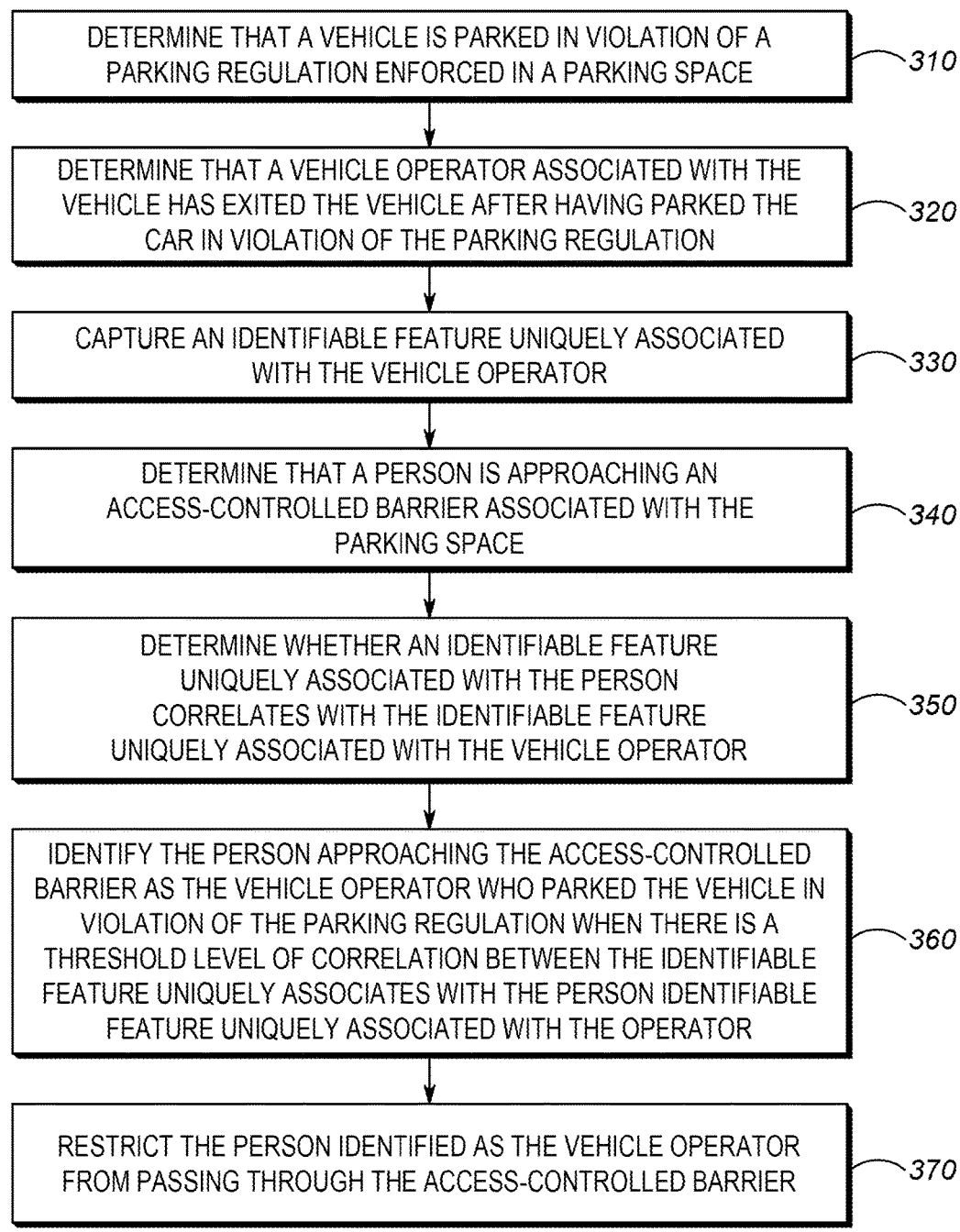
FIG. 3 illustrates a flowchart of a process for restricting a person from passing through an access-controlled barrier in response to a parking violation.

Static memory 216 may store operating code 225 for the electronic processor 213 that, when executed, performs one or more of the blocks set forth in FIG. 3, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may temporarily store sensor data obtained from sensors 120 for the purpose of restricting a vehicle operator (e.g., person 150) from passing through an access-controlled barrier 130 in response to a parking violation. As an example, the static memory 216 may store one or more identifiable features (e.g., vehicle make, brand, license plate number) uniquely associated with a vehicle 160 parked in a particular parking space 170 as well as one or more identifiable features (e.g., face, fingerprint, eye, gait characteristic, birthmarks, moles, body piercings, tattoos, scars etc.) uniquely associated with a vehicle operator who is identified to have operated the vehicle 160 at the time of parking the vehicle 160 in a parking space 170. In one embodiment, the electronic computing device 110 may process one or more identifiable features (e.g., vehicle license plate number) corresponding to a vehicle 160 to further identify information corresponding to a registered owner (e.g., person 150) of the vehicle 160. The electronic computing device 110 may further store information indicating whether or not a vehicle operator is identified (based on sensor data captured by the sensors 120 such as cameras) to have parked the vehicle 160 in violation of a parking regulation. The static memory 216 may also store one or more identifiable features (e.g., face, fingerprint, eye, gait characteristic, birthmarks, moles, body piercings, tattoos, scars etc.) uniquely associated with persons (e.g., vehicle operators) who may approach and/or attempt to pass through the access-controlled barrier 130. In accordance with embodiments, the electronic computing device 110 compares one or more of the identifiable features captured corresponding to the vehicle operator with an identifiable feature captured corresponding to the person 150 approaching the access-controlled barrier to identify if the person 150 approaching the access-controlled barrier 130 is same as the vehicle operator who is identified to have parked the vehicle 160 in violation of the parking regulation and to further restrict the person 150 from passing through the access-controlled barrier 130 unless the person 150 re-parks the vehicle 160 in compliance with the parking regulations enforced in the parking space 170.

The electronic computing device 110 further includes or otherwise is communicatively coupled to an electronic display 218 and/or electronic speaker 220. The electronic display 218 and/or electronic speaker 220 may be provided in areas (e.g., in proximity to the access-controlled barrier 130) that are accessible by persons 150 attempting to pass through the access-controlled barrier 130. When a decision is made by the electronic computing device 110 to restrict a person 150 from passing through the access-controlled barrier 130, the electronic computing device 110 controls the electronic display 218 and/or speaker 220 to provide visual and/or audible information indicating that the person 150 is being restricted from passing through the access-controlled barrier 130 for a parking violation. Optionally, the electronic display 218 and/or speaker 220 is further controlled by the electronic computing device 110 to provide visual and/or audible information citing a parking regulation that was particularly violated by the person 150. The electronic computing device 110 may also control the electronic display 218 and/or speaker 220 to request the person 150 to re-park the vehicle 160 in compliance with the parking regulation before attempting again to pass through the access-controlled barrier 130. The electronic display 218, for example, includes a liquid crystal display (LCD) screen or an organic light emitting (OLED) display screen. In some embodiments, the display 218 includes a touch sensitive input interface to allow persons (e.g., persons who were restricted from passing through the barrier 130) to interact with the content rendered on the display 218 and/or to explain the circumstances surrounding the parking violation. In one embodiment, the electronic computing device 110 may override the decision to restrict the person 150 from passing through the access-controlled barrier 130 after verifying that the person is potentially associated with an emergency incident.

Turning now to FIG. 3, a flowchart diagram illustrates a process 300 for restricting a vehicle operator from passing through an access-controlled barrier 130 in response to a parking violation. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 300 at power-on, at some predetermined periodic time period thereafter, in response to a trigger raised locally at the electronic computing device 110 via an internal process or via an input interface or in response to a trigger from an external device (e.g., an agency responsible for enforcing parking regulations in the parking spaces 170 may use an external computing device to request the electronic computing device 110 to initiate the process 300) to which the electronic computing device 110 is communicably coupled, among other possibilities. As an example, the electronic computing device 110 is programmed to automatically trigger execution of the process 300 in response to receiving sensor data indicating that a vehicle 160 has occupied a parking space 170.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well.

At block 310, the electronic computing device 110 determines that a vehicle 160 is parked in violation of a parking regulation enforced in a parking space 170. In accordance with some embodiments, the electronic computing device 110 receives sensor data captured by one or more sensors 120 deployed for monitoring the parking spaces 170 associated with a facility 180. In one embodiment, the sensor data may include visual data such as images and/or videos captured by visual sensors such as video cameras having a field-of-view to the one or more parking spaces 170. In this embodiment, the electronic computing device 110 may use an image and/or video analytics engine to detect if a vehicle 160 is parked in violation of a parking regulation enforced in the parking space 170. As an example, a parking regulation may require that a parking space be occupied only by vehicles displaying valid permits. In this example, the electronic computing device 110 may process an image or video (captured by sensors 120 such as cameras) corresponding to the vehicle 160 parked at the parking space 170 to determine if the image or video contains an instance of a sticker with a valid permit. If the image or video does not contain an instance of a sticker with a valid permit, the electronic computing device 110 may determine that the vehicle 160 parked in the parking space 170 violates the parking regulation by not displaying a valid permit. In one embodiment, the sensor data may include non-visual data captured by non-visual sensors such as temperature sensors, pressure sensors, ultrasonic sensors, and the like. As an example, a parking regulation may prohibit parking of vehicles in certain spaces marked as no-parking zones. In this example, the electronic computing device 110 may process non-visual sensor data (e.g., temperature data, pressure data, sound data etc.) captured corresponding to a parking space marked as a no-parking zone to determine if there is a threshold change in sensor values such as temperature, pressure, sound, and the like captured from the no-parking zone. If the electronic computing device 110 determines that there is a threshold change in sensor values corresponding to a parking space, then the electronic computing device 110 determines that a vehicle 160 is parked in violation of the parking regulation that prohibits parking of vehicles in no-parking zones. In this manner, the electronic computing device 110 may be programmed to detect any type of parking violations using visual and/or non-visual sensor data captured by the sensor(s) 120.

At block 320, the electronic computing device 110 determines that a vehicle operator associated with the vehicle 160 has exited the vehicle 160 after having parked the vehicle in violation of the parking regulation. As an example, the electronic computing device 110 may process visual sensor data such as images and/or videos captured corresponding to the vehicle 160 to detect if a vehicle operator who operated the vehicle 160 at the time of parking the vehicle 160 has exited the vehicle 160 after having parked the vehicle in violation of the parking regulation. In one embodiment, the electronic computing device 110 may determine that the vehicle operator has exited the vehicle 160 if an image or video captured corresponding to the vehicle 160 does not contain any instance of a person occupying a vehicle operator seat and/or if the image or video contains an instance of a person exiting from a driver-side door. If the analysis of the image or video does not indicate that the vehicle operator has exited the vehicle 160, the electronic computing device 110 continues to monitor if the vehicle operator is exiting from the vehicle and/or if the vehicle operator is adjusting the parking of the vehicle 160 to comply with the parking regulations.

At block 330, the electronic computing device 110 captures one or more identifiable features uniquely associated with the vehicle operator. As an example, the electronic computing device 110 may process visual sensor data such as images and/or video captured corresponding to a vehicle operator identified to have operated the vehicle 160 at the time of parking the vehicle 160. The electronic computing device 110 may extract and store an identifiable feature such as a facial feature of the vehicle operator from the images and/or video captured to the vehicle operator. The electronic computing device 110 may also store information linking identifiable feature(s) of each vehicle operator to (i) information identifying a parking space (e.g., floor number, space number etc.) at which the vehicle 160 is parked, (ii) information identifying the vehicle itself (e.g., vehicle make, brand, type, license plate number), and (iii) information indicating that the vehicle 160 operated by the vehicle operator is parked in violation of one or more parking regulations enforced in the particular parking space where the vehicle 160 is parked, and (iv) information citing the particular parking regulations being violated by the vehicle operator.

At block 340, the electronic computing device 110 determines that a person is approaching an access-controlled barrier 130 associated with the parking space. In accordance with some embodiments, the electronic computing device 110 processes visual and non-visual sensor data obtained from sensors 120 (and/or access control reader 190) deployed in proximity to the access-controlled barrier 130 to determine if such sensor data provides an indication of a person 150 approaching the access-controlled barrier 130. The electronic computing device 110 also captures one or more identifiable features such as facial features of the person 150 approaching the access-controlled barrier 130. In one embodiment, a person who is otherwise authorized (e.g., as a resident, visitor, or employee) to enter a second facility (e.g., a residential building or an officer building) connected to the facility 180 (e.g., parking lot) may attempt to pass through the access-controlled barrier 130 in order to enter the second facility. In this embodiment, the access control reader 190 coupled to the access-controlled barrier 130 may be employed to determine whether there is a person 150 attempting to pass through the access-controlled barrier 130. The access control reader 190 may be configured to read an access control token (an RFID tag, QR code etc.) from a badge or mobile device associated with the person 150. In this case, the access control reader 190 may retrieve information about one or more identifiable features (e.g., facial feature, vehicle license plate number, name, contact number etc.) uniquely associated with the person 150 based on the access control token received from the person. If the electronic computing device 110 detects multiple persons approaching the access-controlled barrier 130, the electronic computing device 110 similarly captures one or more identifiable features uniquely associated with each such person approaching the access-controlled barrier 130. For the purposes of this disclosure, the electronic computing device 110 may capture one or more identifiable features uniquely associated with only those persons on foot who are detected as approaching the access-controlled barrier 130.

At block 350, the electronic computing device 110 determines whether an identifiable feature uniquely associated with the person 150 correlates with one or more identifiable features uniquely associated with the vehicle operator who parked the vehicle in violation of the parking regulation. As an example, the electronic computing device 110 may correlate a facial feature of the person approaching the access-controlled barrier 130 with a facial feature of one or more vehicle operators who were previously identified to have parked their respective vehicles in violation of one or more parking regulations enforced in the respective parking spaces 170. If there is a threshold level (e.g., greater than 98% correlation) of correlation between an identifiable feature of the person 150 approaching the access-controlled barrier 130 and an identifiable feature of the vehicle operator who parked the vehicle 160 in violation of a parking regulation, the electronic computing device 110 proceeds to block 360.

At block 360, when there is a threshold level of correlation between an identifiable feature of the person 150 approaching the access-controlled barrier 130 and an identifiable feature of the vehicle operator who parked the vehicle in violation of one or more parking regulations, the electronic computing device 110 identifies the person 150 approaching the access-controlled barrier 130 as a vehicle operator who parked in violation of the parking regulation. In this case, the electronic computing device 110 may store information, for example, at the static memory 216, indicating that the person 150 approaching the access-controlled barrier 130 is the same as the vehicle operator who violated the parking regulation.

At block 370, the electronic computing device 110 restricts the person 150 identified as the vehicle operator from passing through the access-controlled barrier 130. In one embodiment, the electronic computing device 110 transmits an electronic signal to the access-controlled barrier 130 with an instruction to lock or close the access-controlled barrier 130. In one embodiment, the electronic signal may additionally include information identifying the identifiable feature of the person 150 to enable the access-controlled barrier 130 to restrict only a person with a threshold level of correlation with the identifiable feature included in the electronic signal. The access-controlled barrier 130 may be selectively unlocked or opened to allow other persons such as passengers or other vehicle operators who parked their vehicle in compliance with the parking regulations before approaching the access-controlled barrier 130.

In accordance with some embodiments, the electronic computing device 110 also controls an electronic display 218 and/or speaker 220 provided in proximity to the access-controlled barrier 130 to provide information indicating that the person 150 identified as the vehicle operator is being restricted from passing through the access-controlled barrier for a parking violation. Optionally, visual and/or audible information citing the parking violation(s) particularly violated by the person 150 identified as the vehicle operator is also provided via the electronic display 218 and/or speaker 220 along with a request to the person 150 to re-park the vehicle in compliance with the parking regulations enforced in the facility 180.

In accordance with some embodiments, responsive to determining (at block 310) that a vehicle 160 is parked in violation of a parking regulation enforced in the parking space 170, the electronic computing device 110 retrieves contact information associated with a vehicle operator associated with the vehicle 160. The electronic computing device 110 generates an electronic message including information indicating that the vehicle 160 associated with the vehicle operator is parked in violation of the parking regulation enforced in the parking space 170. The electronic computing device 110 then transmits the electronic message to a communication device associated with the vehicle operator based on the retrieved contact information. In one embodiment, the electronic computing device 110 transmits the electronic message to the vehicle operator as soon as the vehicle is detected to have been parked in violation of a parking regulation. In another embodiment, the electronic computing device does not transmit the electronic message until it is detected that the vehicle operator is no longer occupying the vehicle 160 and that the vehicle operator has exited the vehicle 160 after having parked the vehicle 160 in violation of a parking regulation. In any case, in these embodiments, a vehicle operator is notified of a parking violation before approaching the access-controlled barrier 130 to allow the vehicle operator an opportunity to take an action to re-park the vehicle in compliance with the parking regulations enforced at the parking facility 180 and further avoid being restricted from passing through the access-controlled barrier 130.

In one embodiment, prior to restricting a person 150 (i.e., vehicle operator who parked the vehicle in violation of a parking regulation) from passing through the access-controlled barrier 130, the electronic computing device 110 determines whether the person 150 is associated with an emergency incident. The electronic computing device 110 may determine that a person approaching the access-controlled barrier 130 is associated with an emergency incident based on sensor data obtained from sensors 120 or based on communications received from a public-safety agency. For example, an emergency incident may be detected when sensor data captured corresponding to a vehicle parked in a parking space indicates that the vehicle operator or another passenger exiting the vehicle 160 has injuries requiring urgent medical attention. As another example, an emergency incident may be detected when the electronic computing device 110 receives a communication from a public-safety agency indicating that the vehicle (for example, identified by a vehicle license plate number) is operated by a public-safety officer who is currently assigned to respond to an emergency incident. In this embodiment, when the electronic computing device 110 determines that a person 150 approaching the access-controlled barrier 130 is associated with an emergency incident, the electronic computing device 110 refrains from restricting the person 150 from passing through the access-controlled barrier 130 even if the person 150 is identified as a vehicle operator who parked the vehicle 160 in violation of a parking regulation. In this case, the electronic computing device 110 may additionally send an electronic signal to the access-controlled barrier 130 with an instruction to permit the person 150 to pass through the access-controlled barrier 130.

In accordance with some embodiments, the electronic computing device 110 continues to monitor the status of persons previously restricted from passing through the access-controlled barrier. As an example, subsequent to restricting a person from passing through the access-controlled barrier 130, the electronic computing device 110 may obtain updated sensor data corresponding to a vehicle 160 that was previously parked in violation of a parking regulation. If the updated sensor data indicates that the vehicle 160 has been re-parked in a parking space 170 in compliance with the parking violation, then the electronic computing device 110 permits a previously restricted person 150 to pass through the access-controlled barrier 130 when the same person 150 (for example, determined based on a threshold level of correlation between one or more identifiable features associated with the person 150 with one or more identifiable features captured corresponding to a vehicle operator who operated the vehicle 160 at the time re-parking the vehicle) approaches the access-controlled barrier 130 after having re-parked the vehicle 160 in compliance with the parking regulation. In one embodiment, prior to permitting a person 150 to pass through the access-controlled barrier 130, the electronic computing device 110 further checks whether the person (e.g., as a visitor, employee, resident etc.) is authorized to access a facility connected to the access-controlled barrier. As an example, the electronic computing device 110 may determine that the person 150 is authorized to access the facility in response to a signal received from the access control reader 190 indicating that an access control token received (e.g., via an RFID badge presented by the person 150) corresponding to the person 150 is valid.

Returning to block 350, if the electronic computing device 110 determines that there is no threshold level of correlation between identifiable features of a person 150 approaching the access-controlled barrier and identifiable features of the vehicle operator(s) who parked the vehicle in violation of one or more parking regulations, then the electronic computing device 110 identifies that the person 150 approaching the access-controlled barrier 130 is not same as the vehicle operator(s) who parked the vehicle in violation of the parking regulation. In this case, the electronic computing device 110 further checks if the person 150 is otherwise authorized to access a facility connected to the access-controlled barrier 130 and permits the person 150 to pass through the access-controlled barrier by transmitting an electronic signal to the access-controlled barrier 130 with an instruction to unlock or open the access-controlled barrier 130. The electronic signal may additionally include information identifying the identifiable feature of the person 150 to enable the access-controlled barrier 130 to permit only a person with a threshold level of correlation with the identifiable feature included in the electronic signal to pass through the access-controlled barrier 130.

Figure 4:
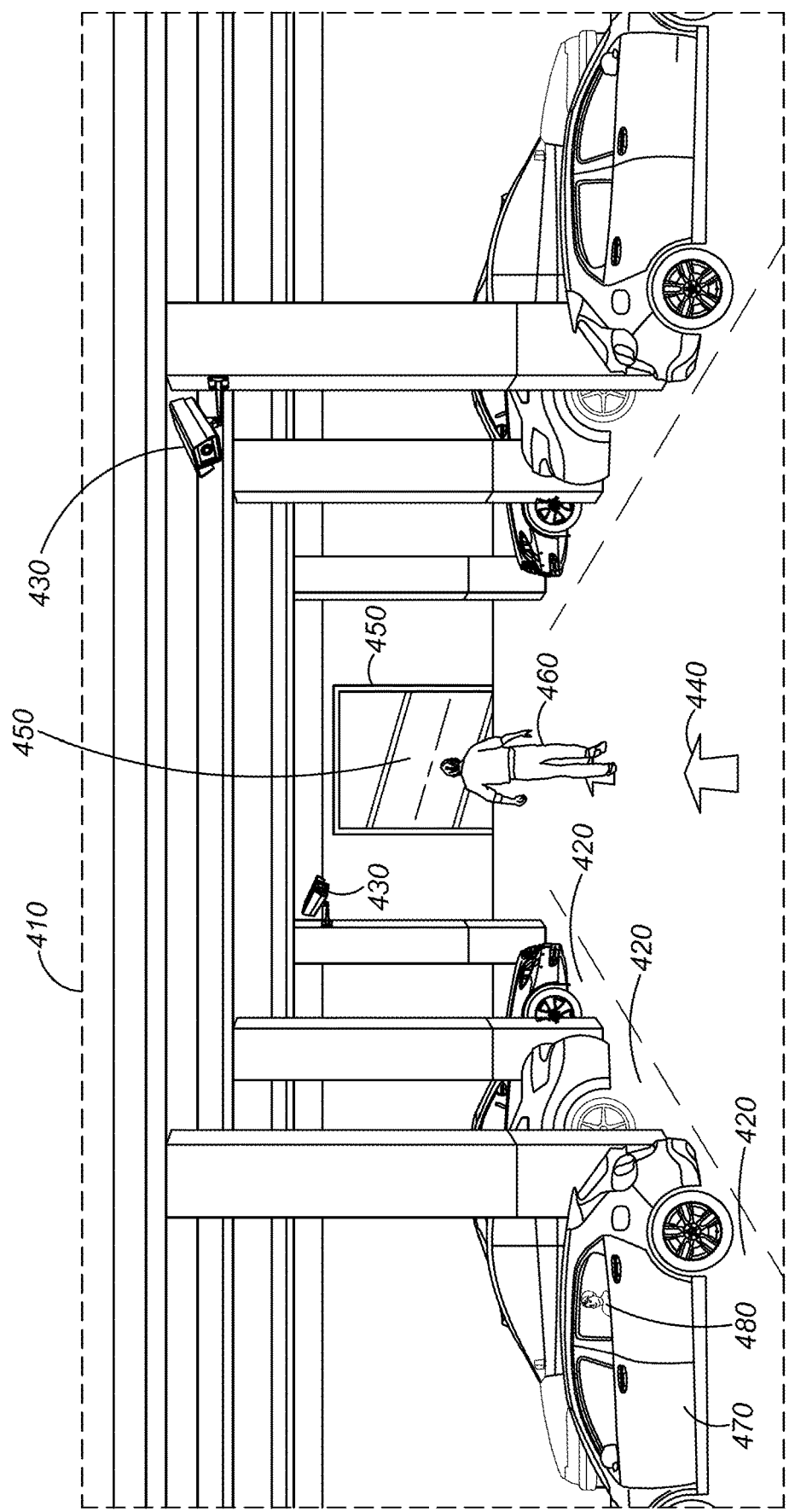
FIGS. 4 and 5 show examples of facilities in which the embodiments described herein can be advantageously implemented.
Figure 5:
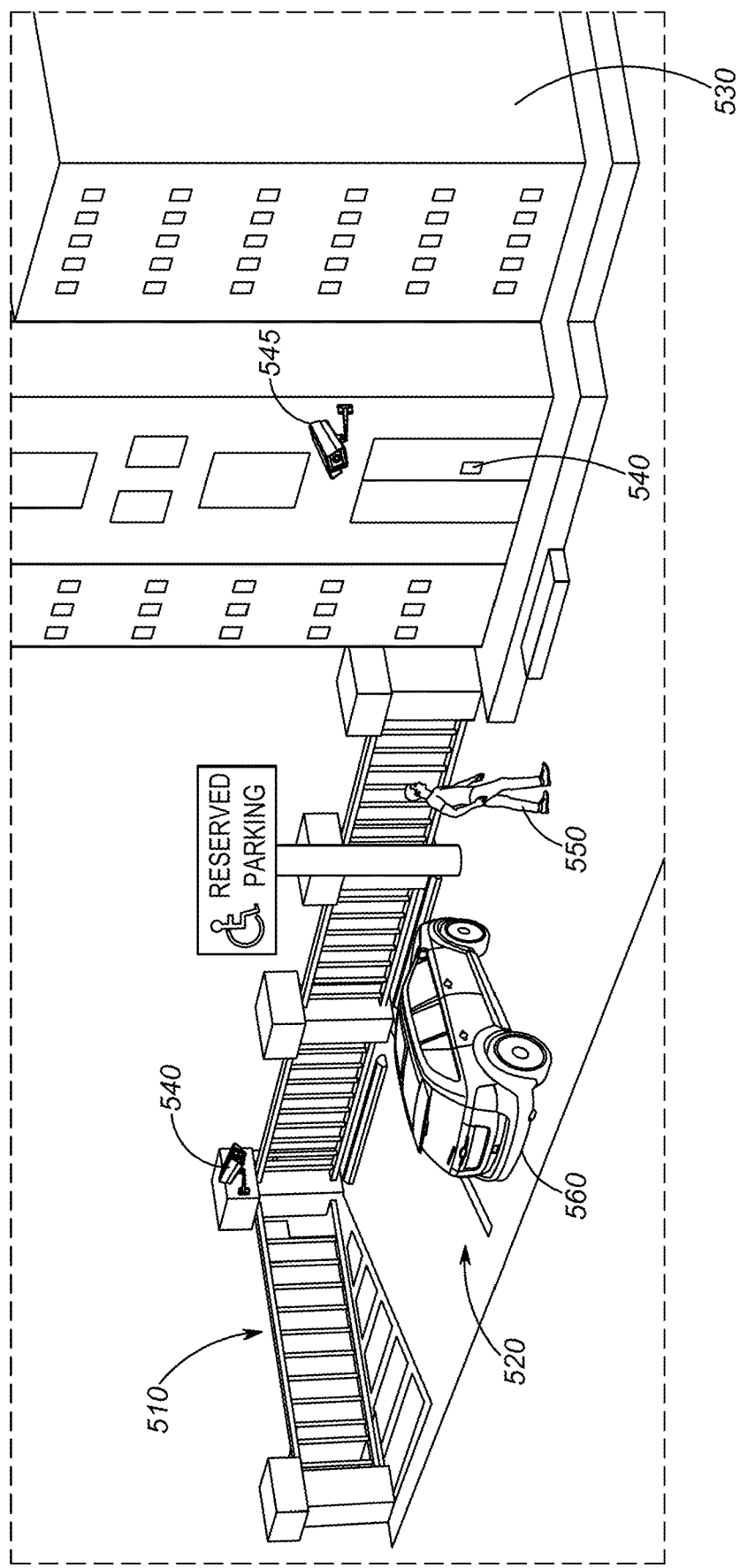

Now referring to FIGS. 4 and 5, examples of facilities in which embodiments described herein can be advantageously implemented are shown. In FIG. 4, an enclosed parking facility 410 with multiple parking spaces 420 is shown. Sensors such as cameras 430 are deployed at the parking facility 410 to monitor parking spaces 420 and pathway 440 leading to an access-controlled barrier 450. The access-controlled barrier 450 may include a door that connects the parking facility 410 to a street entrance or another facility. Assume a person 460 is approaching the access-controlled barrier 450 to exit the parking facility 410 after having parked a vehicle 470 is in one of the monitored parking spaces 420. Further assume a child 480 is left unaccompanied in the vehicle 470 parked in the parking space 420. In conventional parking facilities, a person 460 would park the vehicle 470 in one of the parking spaces 420 and would simply pass through a door or elevator without being particularly subject to parking-violation related restrictions. In contrast, in a parking facility 410 that is implemented in accordance with the embodiments described herein, a person 460 attempting to exit the parking facility would be subject to restriction at a door or elevator if the person is identified as someone who parked the vehicle 470 in violation of parking regulations enforced by the parking facility 410 in the parking space 420. In the example shown in FIG. 4, the camera 430 deployed at the parking facility 410 captures and sends an image or video of a child 480 who is left unaccompanied in a parked vehicle 470. An electronic computing device 110 shown in FIG. 1 and/or FIG. 2 processes the image or video received from the camera 430 using an image and/or video analytics engine and further detects that the image or video contains an instance of a child 480 left behind in a parked vehicle 470. The electronic computing device 110 may further determine that leaving behind a child in a parked vehicle is in violation of a parking regulation. The electronic computing device 110 then sends an instruction to the access-controlled barrier 450 to restrict the person 460 from passing through the access-controlled barrier 450 and exiting the parking facility 410. The electronic computing device 110 further sends one or more identifiable features (e.g., facial features) captured corresponding to the person 460 to ensure the access-controlled barrier 450 is restricting the person (and not someone else who is in compliance with parking regulations) who is identified to have left a child unaccompanied in a parked vehicle 470 in violation of the parking regulation.

In FIG. 5, an unenclosed parking facility 510 is shown with a parking space 520. The unenclosed parking facility 510 is shown connected to a second facility such as a residential building 530. Sensors such as video cameras 540 are deployed at the parking facility 510 to monitor the parking space 520 at the parking facility 510 and an access-controlled barrier 545 provided at the entrance to the residential building 530. The access-controlled barrier 545 is configured to permit residents and visitors entry to the residential building 530 after validating their access. Assume that the parking space 520 is reserved for people with disabilities and a corresponding parking regulation enforced at the parking space 520 requires a parked vehicle to display a disability parking permit at all times. Further assume a person 550 is approaching the access-controlled barrier 545 to enter the residential building 530 after having parked a vehicle 560 that does not display a disability parking permit. In conventional residential buildings, an authorized person would be able to gain entry to the residential building without being particularly subject to any parking-violation related restriction at the building entrance. In contrast, in a residential building 530 that is implemented in accordance with the embodiments described herein, a person 550 attempting to enter the residential building would be subject to restriction at the building entrance if the person 550 is identified as someone who parked a vehicle in a parking space 520 in violation of a parking regulation. In the example shown in FIG. 5, the camera 540 deployed at the parking facility 510 captures and sends an image or video corresponding to a portion of the vehicle 560 where parking permits are designed to be displayed. An electronic computing device 110 shown in FIG. 1 and/or FIG. 2 processes the image or video received from the camera 540 using an image and/or video analytics engine and further detects if the image or video contains an instance of a valid parking permit. In the example shown in FIG. 5, since the vehicle 560 does not display a valid parking permit, the electronic computing device 110 also does not detect any instance of a valid parking permit during analysis of the image or video captured corresponding to the vehicle 560 and further determines that the vehicle 560 is parked in the parking space 520 in violation of a parking regulation enforced in the parking space 520. The electronic computing device 110 then sends an instruction to the access-controlled barrier 545 to restrict the person 550 from passing through the access-controlled barrier 545 and entering the residential building 530. In response, the access-controlled barrier 545 restricts the entry of person 550 to the residential building regardless of whether the person 550 is authorized to enter the building as a resident or visitor. The electronic computing device 110 further sends one or more identifiable features (e.g., facial features) captured corresponding to the person 550 to the access-controlled barrier 545 to ensure that the access-controlled barrier 545 is restricting the person (and not someone else who is in compliance with parking regulations) who is identified to have parked the vehicle 560 in violation of the parking regulation. Embodiments described herein can be similarly applied to restrict persons for parking violations in other forms of parking facilities as well.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate element or device via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of restricting a vehicle operator from passing through an access-controlled barrier in response to a parking violation, the method comprising:
    determining, at an electronic computing device, that a vehicle is parked in violation of a parking regulation enforced in a parking space;
    determining, at the electronic computing device, that a vehicle operator associated with the vehicle has exited the vehicle after having parked the vehicle in violation of the parking regulation;
    capturing, at the electronic computing device, an identifiable feature uniquely associated with the vehicle operator;
    determining, at the electronic computing device, that a person is approaching an access-controlled barrier associated with the parking space;
    determining, at the electronic computing device, whether an identifiable feature uniquely associated with the person correlates with the identifiable feature uniquely associated with the vehicle operator;
    identifying, at the electronic computing device, the person approaching the access-controlled barrier as the vehicle operator who parked the vehicle in violation of the parking regulation when there is a threshold level of correlation between the identifiable feature uniquely associated with the person and the identifiable feature uniquely associated with the vehicle operator; and
    restricting, at the electronic computing device, the person identified as the vehicle operator from passing through the access-controlled barrier.

2. The method of claim 1, wherein restricting comprises:
    transmitting an electronic signal from the electronic computing device to the access-controlled barrier to lock the access-controlled barrier.

3. The method of claim 1, further comprising:
    controlling an electronic display or speaker provided in proximity to the access-controlled barrier to provide information indicating that the person identified as the vehicle operator is being restricted from passing through the access-controlled barrier for a parking violation.

4. The method of claim 1, further comprising:
    controlling an electronic display or speaker provided in proximity to the access-controlled barrier to provide information citing the parking regulation particularly violated by the person identified as the vehicle operator.

5. The method of claim 1, further comprising:
    controlling an electronic display or speaker provided in proximity to the access-controlled barrier to request the person identified as the vehicle operator to comply with the parking regulation.

6. The method of claim 1, further comprising:
    when the identifiable feature uniquely corresponding to the person does not match with the one or more identifiable features uniquely corresponding to the vehicle operator, identifying that the person approaching the access-controlled barrier is not same as the vehicle operator who parked the vehicle in violation of the parking regulation; and permitting the person to pass through the access-controlled barrier after verifying that the person is authorized to access a facility connected to the access-controlled barrier.

7. The method of claim 6, wherein permitting comprises:
transmitting an electronic signal to the access-controlled barrier to unlock the access-controlled barrier.

8. The method of claim 1, further comprising:
determining, subsequent to restricting the person identified as the vehicle operator from passing through the access-controlled barrier, that the vehicle has been re-parked in compliance with the parking regulation; and permitting the person identified as the vehicle operator to pass through the access-controlled barrier when the person identified as the vehicle operator approaches the access-controlled barrier after having re-parked the vehicle in compliance with the parking regulation.

9. The method of claim 1, further comprising:
responsive to determining that the vehicle is parked in violation of a parking regulation enforced in the parking space, retrieving contact information associated with the vehicle operator associated with the vehicle;
generating an electronic message including information indicating that the vehicle associated with the vehicle operator is parked in violation of the parking regulation enforced at the parking space; and
transmitting the electronic message to a communication device associated with the vehicle operator based on the retrieved contact information.

10. The method of claim 1, further comprising:
prior to restricting the person identified as the vehicle operator from passing through the access-controlled barrier, determining whether the vehicle operator is associated with an emergency incident; and
refraining from restricting the person identified as the vehicle operator from passing through the access-controlled barrier when the vehicle operator is determined to be associated with the emergency incident.

11. The method of claim 1, further comprising:
storing information linking one or more identifiable features uniquely associated with the vehicle to the one or more identifiable features uniquely associated with the vehicle operator.

12. The method of claim 11, further comprising:
capturing the one or more identifiable features uniquely associated with the vehicle and the one or more identifiable features uniquely associated with the vehicle operator using one or more sensors deployed at the parking space.

13. The method of claim 1, further comprising:
determining that the vehicle is parked in violation of the parking regulation based on sensor data captured by one or more sensors deployed at the parking space.

14. An electronic computing device, comprising:
a communications interface; and
an electronic processor communicatively coupled to the communications interface, the electronic processor configured to:

determine that a vehicle is parked in violation of a parking regulation enforced in a parking space;
determine that a vehicle operator associated with the vehicle has exited the vehicle after having parked the vehicle in violation of the parking regulation;
capture one or more identifiable features uniquely associated with the vehicle operator;
determine that a person is approaching an access-controlled barrier associated with the parking space;
determine whether an identifiable feature uniquely associated with the person matches with the one or more identifiable features uniquely associated with the vehicle operator;
identify the person approaching the access-controlled barrier as the vehicle operator who parked the vehicle in violation of the parking regulation when the identifiable feature uniquely associated with the person matches with the one or more identifiable features uniquely associated with the vehicle operator; and
restrict the person identified as the vehicle operator from passing through the access-controlled barrier.

15. The electronic computing device of claim 14, wherein the electronic processor is configured to transmit, via the communications interface, an electronic signal to the access-controlled barrier to lock the access-controlled barrier.

16. The electronic computing device of claim 14, wherein the electronic processor is configured to control an electronic display or speaker provided in proximity to the access-controlled barrier to provide information indicating that the person identified as the vehicle operator is being restricted from passing through the access-controlled barrier for a parking violation.

17. The electronic computing device of claim 14, wherein the electronic processor is configured to:
identify that the person approaching the access-controlled barrier is not same as the vehicle operator who parked the vehicle in violation of the parking regulation when the identifiable feature uniquely corresponding to the person does not match with the one or more identifiable features uniquely corresponding to the vehicle operator, and
permit the person to pass through the access-controlled barrier after verifying that the person is authorized to access a facility connected to the access-controlled barrier.

18. The electronic computing device of claim 17, wherein the electronic processor is configured to transmit, via the communications interface, an electronic signal to the access-controlled barrier to unlock the access-controlled barrier.

19. The electronic computing device of claim 14, wherein the electronic processor is configured to:
determine whether the vehicle operator is associated with an emergency incident; and
refrain from restricting the person identified as the vehicle operator from passing through the access-controlled barrier when the vehicle operator is determined to be associated with the emergency incident.

20. The electronic computing device of claim 14, wherein the electronic processor is configured to determine that the vehicle is parked in violation of the parking regulation based on sensor data captured by one or more sensors deployed at the parking space.

* * * * *